US010068162B2

(12) United States Patent
Lin

(10) Patent No.: US 10,068,162 B2
(45) Date of Patent: Sep. 4, 2018

(54) IMAGE FORMING APPARATUS HAVING RACK AND PINION DEVICE FOR SORTER

(71) Applicant: AVISION INC., Hsinchu (TW)

(72) Inventor: Chia-Hsin Lin, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 15/489,397

(22) Filed: Apr. 17, 2017

(65) Prior Publication Data
US 2017/0337454 A1    Nov. 23, 2017

(30) Foreign Application Priority Data
May 20, 2016   (TW) ............................. 105115662 A

(51) Int. Cl.
| | | |
|---|---|---|
| B65H 31/26 | (2006.01) |
| G06K 15/00 | (2006.01) |
| H04N 1/00 | (2006.01) |
| B65H 29/14 | (2006.01) |
| B65H 33/08 | (2006.01) |

(52) U.S. Cl.
CPC ........... *G06K 15/404* (2013.01); *B65H 29/14* (2013.01); *B65H 31/26* (2013.01); *B65H 33/08* (2013.01); *H04N 1/0032* (2013.01); *H04N 1/0057* (2013.01); *H04N 1/00602* (2013.01); *B65H 2301/4219* (2013.01); *B65H 2301/42192* (2013.01); *B65H 2403/41* (2013.01); *B65H 2404/1424* (2013.01); *B65H 2404/612* (2013.01); *H04N 2201/0082* (2013.01)

(58) Field of Classification Search
CPC .... G06K 15/404; B65H 31/26; H04N 1/0032; H04N 1/0057; H04N 1/00602
See application file for complete search history.

(56) References Cited

U.S. PATENT DOCUMENTS

| | | | | |
|---|---|---|---|---|
| 4,480,825 A * | 11/1984 | Landa | ................... | B65H 33/08 |
| | | | | 271/182 |
| 5,007,625 A * | 4/1991 | Kremers | ............ | G03G 15/6547 |
| | | | | 270/58.01 |
| 5,037,081 A * | 8/1991 | Engelhardt | ............ | B65H 33/08 |
| | | | | 271/207 |
| 5,431,387 A * | 7/1995 | Loben | ................... | B65H 29/34 |
| | | | | 271/213 |

(Continued)

FOREIGN PATENT DOCUMENTS

EP          0 483 656 B1      7/1996

*Primary Examiner* — Patrick Hewey Mackey

(57) ABSTRACT

An image forming apparatus comprises a printing module, a transporting mechanism and a sorting module. The printing module prints data on media in order. The transporting mechanism transports the media past the printing module. The sorting module is disposed downstream of the transporting mechanism, and comprises an output mechanism, a rack and a driving pinion. The output mechanism transports the media out in a first direction. The rack is connected to the output mechanism. The driving pinion meshing with the rack drives the rack and the output mechanism to reciprocate in a second direction, different from the first direction, to sort the media into stacks. Thus, the sorting function can be achieved without providing a larger space and moving a discharge tray, and this is advantageous to the miniaturization of the image forming apparatus.

8 Claims, 5 Drawing Sheets

(56) References Cited

U.S. PATENT DOCUMENTS

| | | | | |
|---|---|---|---|---|
| 5,513,839 | A * | 5/1996 | Green | B42B 5/00 |
| | | | | 270/58.07 |
| 5,848,346 | A * | 12/1998 | Takashiro | G03G 15/6538 |
| | | | | 270/58.31 |
| 7,046,955 | B2 * | 5/2006 | Hatanaka | G03G 15/6529 |
| | | | | 399/107 |
| 7,159,862 | B2 * | 1/2007 | Matsutomo | B65H 29/14 |
| | | | | 271/207 |
| 7,469,897 | B2 * | 12/2008 | Hiramoto | B65H 33/08 |
| | | | | 271/314 |
| 7,845,634 | B2 * | 12/2010 | Asakawa | B65H 29/22 |
| | | | | 271/200 |
| 8,485,523 | B2 * | 7/2013 | Kimura | B65H 31/26 |
| | | | | 271/220 |
| 2015/0035226 | A1 * | 2/2015 | Nishi | B65H 29/125 |
| | | | | 271/207 |

* cited by examiner

IMAGE FORMING APPARATUS HAVING RACK AND PINION DEVICE FOR SORTER

This application claims priority of No. 105115662 filed in Taiwan R.O.C. on May 20, 2016 under 35 USC 119, the entire content of which is hereby incorporated by reference.

BACKGROUND OF THE INVENTION

Field of the Invention

This disclosure relates to an image forming apparatus having a sorting module, and more particularly to an image forming apparatus using a pinion and a rack to achieve the sorting function.

Description of the Related Art

A typical large-scale copier has a sorter for sorting copies generated when a user copies a plurality of originals. For example, when the user wants to copy an original having five pages into ten copies, the sorter can place ten copies, each having five copied pages, into ten discharge trays, respectively, or place first to five copied pages, each having ten pages, into five discharge trays, respectively, according to the user's choice. Most of these sorters are vertical sorters so that multiple sets of copied documents may be arranged in the discharge trays, respectively, in the vertical direction. However, the sorter has the large size and thus occupies a lot of space in the office.

In another sorting mechanism, the discharge tray is moved horizontally to perform the sorting. However, such the mechanism needs a larger space, within which the discharge tray is moved, and the problem that the sorting mechanism cannot be miniaturized still needs to be solved.

SUMMARY OF THE INVENTION

It is therefore an object of this disclosure to provide an image forming apparatus having a sorting module, wherein a pinion and a rack are used to achieve the sorting function.

To achieve the above-identified object, this disclosure provides an image forming apparatus comprising a printing module, a transporting mechanism and a sorting module. The printing module prints data on media in order. The transporting mechanism transports the media past the printing module. The sorting module is disposed downstream of the transporting mechanism and comprises an output mechanism, a rack and a driving pinion. The output mechanism transports the media out in a first direction. The rack is connected to the output mechanism. The driving pinion meshing with the rack drives the rack and the output mechanism to reciprocate in a second direction and to sort the media into stacks, wherein the second direction is different from the first direction.

The image forming apparatus may further comprise a sensor and a controller. The sensor is disposed on the base, and senses a relative position between the base and the stage assembly to generate a sensing signal. The controller is electrically connected to the sensor and controls a rotating angle of the driving pinion according to the sensing signal of the sensor to make the stage assembly return to a home position.

With the above-mentioned image forming apparatus, the pinion and the rack can be used to achieve the sorting function. Because the pinion and the rack can achieve the continuous transmission, the sorted number of stacks can be automatically adjusted according to the design or usage requirement. In addition, the sorting function can be achieved without providing a larger space and moving a discharge tray, and this is advantageous to the miniaturization of the image forming apparatus. Furthermore, because the calibration of the home position of the output mechanism can be performed when the image forming apparatus boots up, no manufacturing and accumulated errors are obtained.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
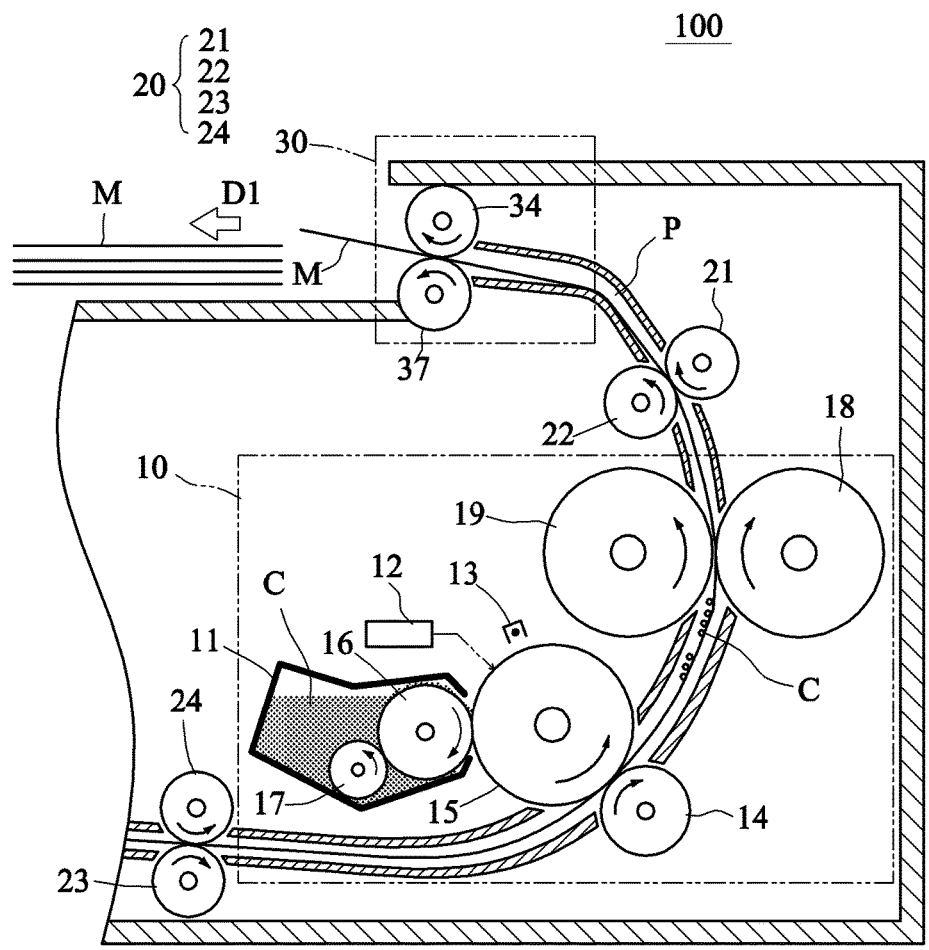
FIG. 1 is a schematic side view showing an image forming apparatus according to a preferred embodiment of this disclosure.
Figure 2:
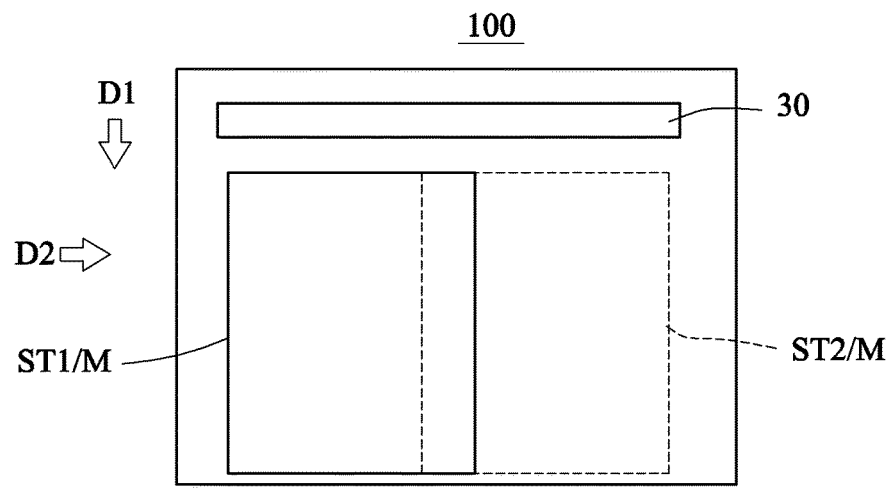
FIG. 2 is a schematic top view showing the image forming apparatus according to the preferred embodiment of this disclosure.

FIGS. 1 and 2 are a schematic side view and a schematic top view showing an image forming apparatus 100 according to the preferred embodiment of this disclosure, respectively. As shown in FIGS. 1 and 2, the image forming apparatus 100 comprises a printing module 10, a transporting mechanism 20 and a sorting module 30.

The printing module 10 may be a printer and prints data on media M in order. The transporting mechanism 20 transports the media M past the printing module 10. In this embodiment, the transporting mechanism 20 comprises transporting rollers 21, 22, 23 and 24. In this embodiment, a laser printing module of a laser printer is described as an example, which does not intend to restrict this disclosure. In another embodiment, an ink-jet printing module of an ink-jet printer, a thermal induction printing module of a thermal induction printer, a dot matrix printing module or a dot matrix printer, or the like.

In the printing module 10, toner C is accommodated in a toner cartridge 11, and a supply roller 17 is rotatably disposed on the toner cartridge 11 to supply the toner C to a rotatable development roller 16. A charger 13 uniformly charges a surface of a rotatable drum 15, and a laser scanning unit 12 outputs a laser beam to form an electrostatic charge pattern on the drum 15. A transfer roller 14 and the drum 15 are rotatably disposed upstream of a heater roller 19, and nip each of the media M, transported from the rollers 23 and 24, therebetween. The transfer roller 14 transfers the electrostatic charge pattern of the drum 15 onto the medium M. Next, the medium M is processed by a pressure roller 18 and the heater roller 19 so that the toner C is fixated onto the medium M. The fixated medium M enters a passage P.

The sorting module 30 is a sorter disposed downstream of the transporting mechanism 20, and sorts the media M into multiple stacks, such as stacks ST1 and ST2, as shown in FIG. 2. It is worth noting that the detailed structures of the sorting module 30 are not shown in FIGS. 1 and 2, and only a phantom-line block is depicted to show its position.

Figure 3:
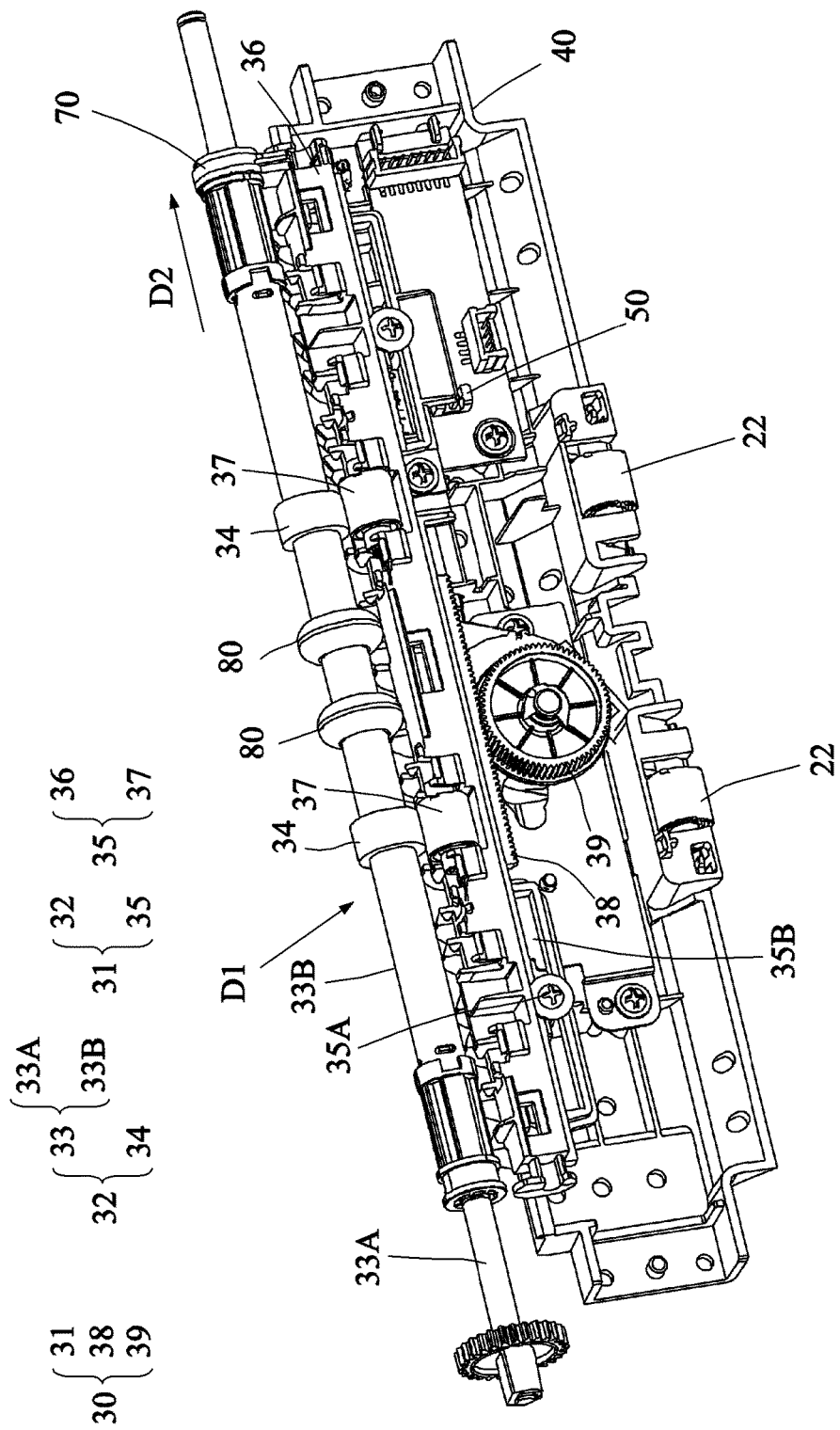
FIGS. 3 to 5 are partial pictorial views showing the image forming apparatus according to the preferred embodiment of this disclosure.
Figure 4:
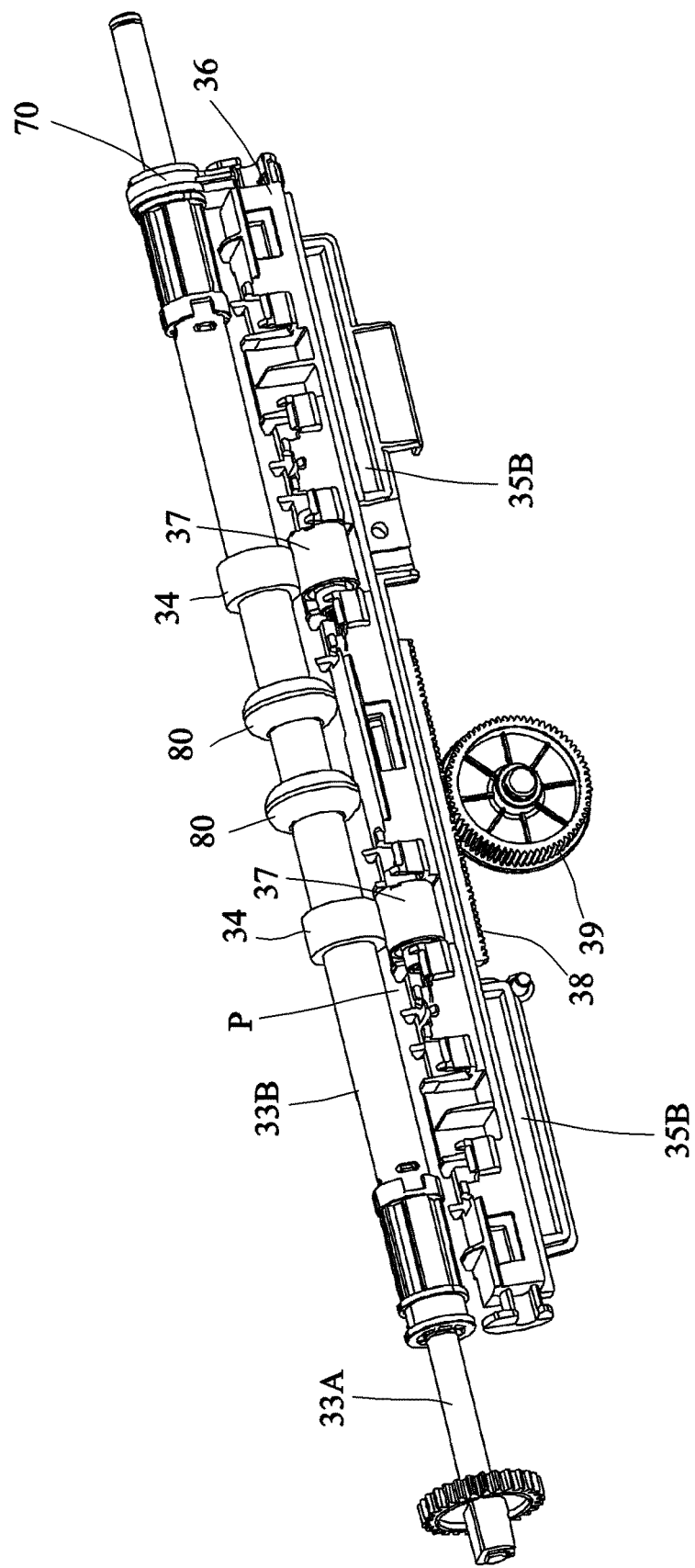
Figure 5:
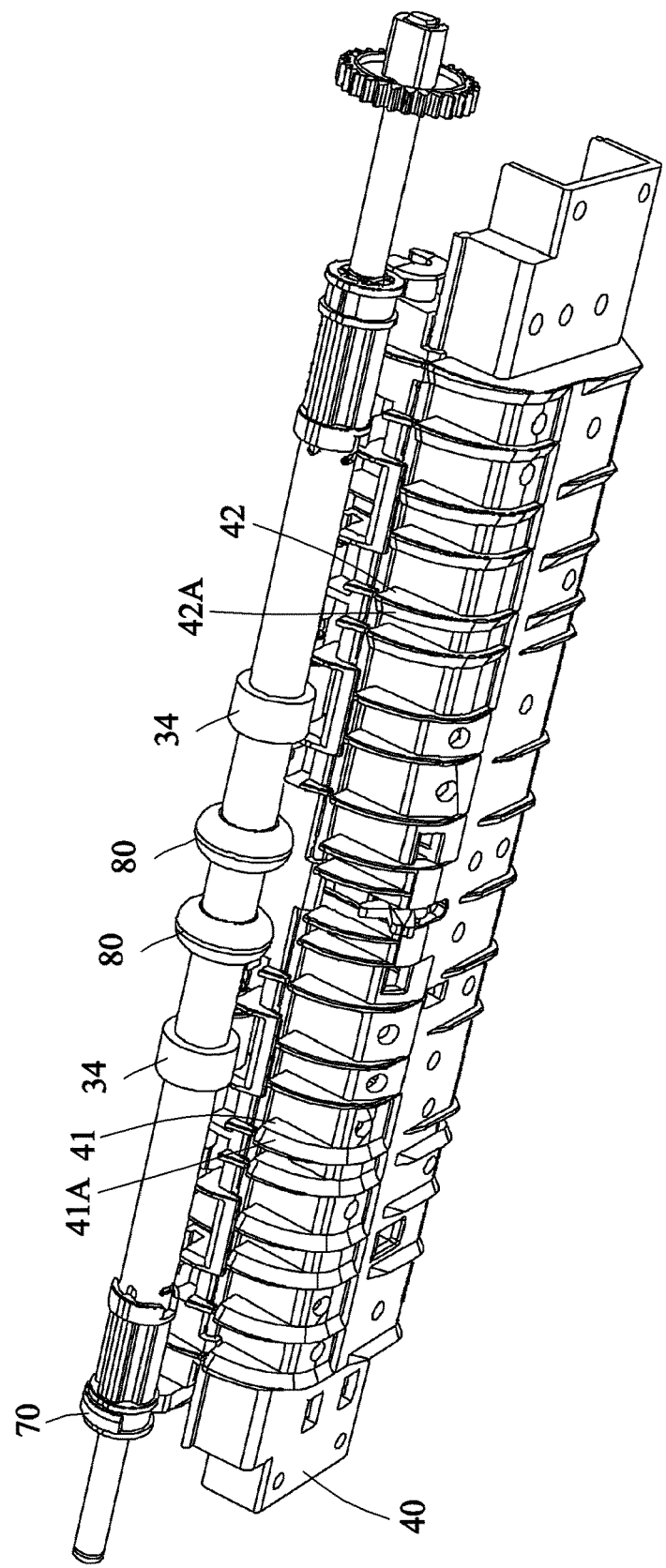

FIGS. 3 to 5 are partial pictorial views showing the image forming apparatus according to the preferred embodiment of this disclosure. Referring to FIGS. 3 and 4 with reference to FIGS. 1 and 2, the sorting module 30 comprises an output mechanism 31, a rack 38 and a driving pinion 39.

The output mechanism 31 transports the media M out in a first direction D1. The output mechanism 31 comprises a rotating assembly 32 and a stage assembly 35. The rotating assembly 32 comprises a rotating shaft assembly 33 and first rollers 34 mounted on the rotating shaft assembly 33. The rotating shaft assembly 33 comprises a driving shaft 33A and a sleeve 33B. In this non-restrictive embodiment, the sleeve 33B has three segments combined together. The driving shaft 33A is rotatably disposed on a housing (not shown) of the image forming apparatus 100. The sleeve 33B is movably mounted on the driving shaft 33A. The first rollers 34 are mounted on the sleeve 33B so that the first rollers 34 can reciprocate in a second direction D2.

The stage assembly 35 comprises a stage 36 and second rollers 37 disposed on the stage 36. The first rollers 34 cooperate with the second rollers 37 to transport the media M out. The rack 38 is connected to the output mechanism 31, and is more particularly mounted on the stage assembly 35. In one example, the rack 38 and the stage assembly 35 are integrally formed by way of injection molding, so that the assembling cost and error can be reduced.

The driving pinion 39 meshes with the rack 38, and drives the rack 38 and the output mechanism 31 to reciprocate in the second direction D2 to sort the media M into multiple stacks. It is worth noting that the second direction D2 is different from the first direction D1. For example, the second direction D2 is perpendicular to the first direction D1.

The driving pinion 39 is rotatably disposed on a base 40 of the image forming apparatus 100. The base 40 may be a housing or a portion of the housing mounted on the image forming apparatus 100. The driving pinion 39 may be driven by a gear (not shown) of a motor 90 (see FIG. 8) to move the output mechanism 31 to multiple positions to sort the media into multiple stacks.

Referring to FIGS. 3 and 4, the stage assembly 35 has a first guiding structure 35A, and the base 40 has a second guiding structure 35B, wherein the first guiding structure 35A and the second guiding structure 35B cooperate with each other to guide the stage assembly 35 to move relatively to the base 40. In FIG. 3, the first guiding structure 35A is a bolt, and the second guiding structure 35B is a slot. However, this disclosure is not restricted thereto.

The image forming apparatus 100 may further comprise a pressing roller 80, which is mounted on the sleeve 33B and presses the media M to level the media M. In addition, the transporting roller 22 of the transporting mechanism 20 is rotatably disposed on the base 40 to constitute a modularized design for the sake of maintenance and replacement.

Figure 8:
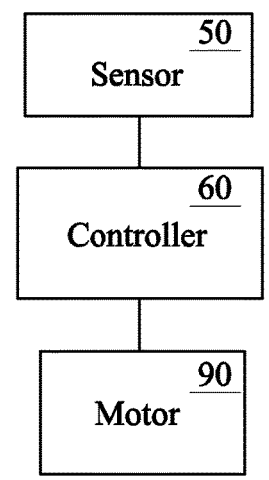
FIG. 8 is a block diagram showing a circuit according to the preferred embodiment of this disclosure.

In addition, the image forming apparatus 100 may further comprise a sensor 50 and a controller 60, as shown in FIG. 8. The sensor 50 is disposed on the base 40 and senses a relative position between the base 40 and the stage assembly 35 to generate a sensing signal. For example, the structure of the stage assembly 35 blocks the optical path of the sensor 50 and generates the sensing signal. The controller 60 electrically connected to the sensor 50 controls the rotating angle of the driving pinion 39 to control the rotating angle of the motor 90 according to the sensing signal of the sensor 50, so that the stage assembly 35 can return to a home position. Consequently, the output mechanism 31 can return to the home position when the image forming apparatus 100 boots up to facilitate the subsequent sorting operation.

Figure 6:
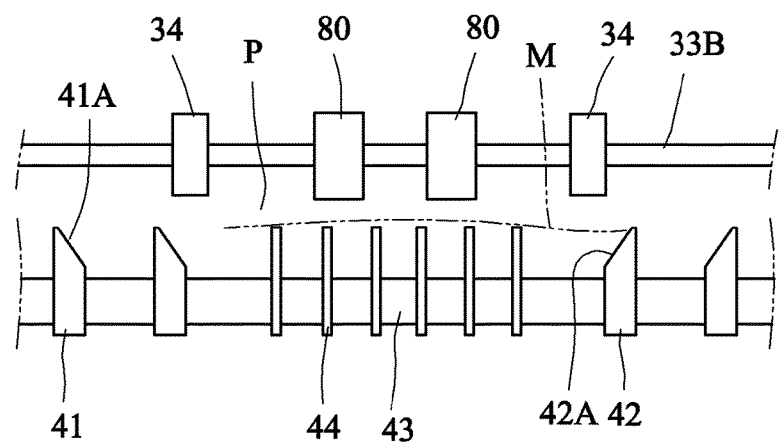
FIG. 6 is a partial front view showing the image forming apparatus according to the preferred embodiment of this disclosure.

FIG. 6 is a partial front view showing the image forming apparatus according to the preferred embodiment of this disclosure. Referring to FIGS. 5 and 6, the base 40 has a plurality of ribs 41 and 42 for guiding the media M into the passage P between the first roller 34 and the second roller 37. Each rib has an inclined surface 41A/42A. An angle is formed between the inclined surface 41A/42A and the passage P, and ranges from 0 to 90 degrees, and more particularly from 10 to 80 degrees. The inclined surfaces 41A and 42A of the ribs 41 and 42 are mirrored about a middle portion 43 of the base 40. When the media M are moved left and right, the inclined surfaces 41A and 42A may guide the media M to move in the second direction D2 thereby preventing the moving media M from jamming. The ribs 44 near the middle portion 43 fall within the ranges of the media M, and there is no edge of the medium M falls between the two ribs 44. So, the ribs 44 near the middle portion 43 need not to have the inclined surfaces. It is worth noting that the number of the ribs in the drawings is only for the illustrative purpose only, and does not fully correspond to the structure of FIG. 5.

Figure 7:
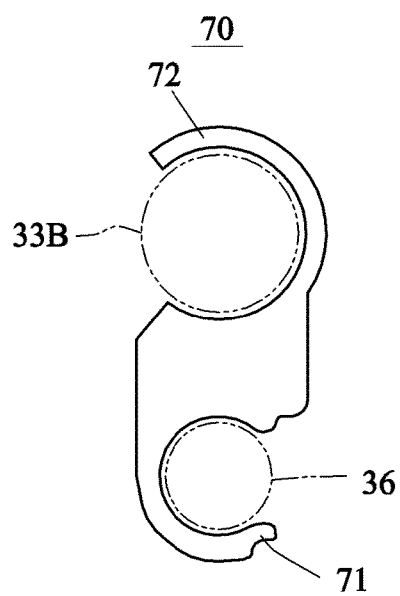
FIG. 7 is a schematic view showing a connecting element according to the preferred embodiment of this disclosure.

FIG. 7 is a schematic view showing a connecting element according to the preferred embodiment of this disclosure. Referring to FIGS. 7, 3 and 5, the image forming apparatus 100 may further comprise a connecting element 70. The connecting element 70 has a first end 71 fastened to the stage 36 of the stage assembly 35, and a second end 72 rotatably fastened to the sleeve 33B. With this connecting element 70, the stage assembly 35 may be moved together with the sleeve 33B while the rotation of the sleeve 33B is maintained. The assembly staff or the maintenance person can separate the stage assembly 35 from the sleeve 33B for the purpose of assembly or maintenance according to the resilience of the connecting element 70. It is worth noting that although only one connecting element 70 is depicted, multiple connecting elements 70 may also be utilized to achieve the stabler transmission effect.

With the above-mentioned image forming apparatus, the pinion and the rack can be used to achieve the sorting function. Because the pinion and the rack can achieve the continuous transmission, the sorted number of stacks can be automatically adjusted according to the design or usage requirement. In addition, the sorting function can be achieved without providing a larger space and moving a discharge tray, and this is advantageous to the miniaturization of the image forming apparatus. Furthermore, because the calibration of the home position of the output mechanism can be performed when the image forming apparatus boots up, no manufacturing and accumulated errors are obtained.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. An image forming apparatus, comprising:
a printing module printing data on media in order;
a transporting mechanism transporting the media past the printing module; and
a sorting module disposed downstream of the transporting mechanism, the sorting module comprising:
an output mechanism transporting the media out in a first direction;
a rack connected to the output mechanism;
a driving pinion, which meshes with the rack and drives the rack and the output mechanism to reciprocate in a second direction and to sort the media into stacks, wherein the second direction is different from the first direction; and
a base, wherein the driving pinion is rotatably disposed on the base;
wherein the output mechanism comprises:
a rotating assembly comprising a rotating shaft assembly and first rollers mounted on the rotating shaft assembly; and
a stage assembly comprising a stage and second rollers disposed on the stage, wherein the first rollers cooperate with the second rollers to transport the media out, and the rack is mounted on the stage assembly; and
wherein the rotating shaft assembly comprises:
a driving shaft rotatably disposed; and
a sleeve movably mounted on the driving shaft, wherein the first rollers are mounted on the sleeve so that the first rollers reciprocate in the second direction.

2. The image forming apparatus according to claim 1, further comprising:
a sensor, which is disposed on the base and senses a relative position between the base and the stage assembly to generate a sensing signal.

3. The image forming apparatus according to claim 2, further comprising:
a controller, which is electrically connected to the sensor and controls a rotating angle of the driving pinion according to the sensing signal of the sensor to make the stage assembly return to a home position.

4. The image forming apparatus according to claim 1, further comprising:
a connecting element having a first end fastened to the stage assembly, and a second end rotatably fastened to the sleeve.

5. The image forming apparatus according to claim 1, wherein the stage assembly has a first guiding structure, the base has a second guiding structure, the first guiding structure and the second guiding structure cooperate with each other to guide the stage assembly to move relatively to the base.

6. The image forming apparatus according to claim 1, further comprising:
a pressing roller, which is mounted on the sleeve and presses the media to level the media.

7. The image forming apparatus according to claim 1, wherein the transporting mechanism comprises a transporting roller rotatably disposed on the base.

8. The image forming apparatus according to claim 1, wherein the base has a plurality of ribs guiding the media into a passage between the first roller and the second roller, each of the ribs has an inclined surface, an angle is formed between the inclined surface and the passage, and the inclined surfaces of the ribs are mirrored about a middle portion of the base.

* * * * *